United States Patent
Mokudai et al.

(10) Patent No.: US 9,647,268 B2
(45) Date of Patent: May 9, 2017

(54) BATTERY CONTAINING RUBEANIC ACID OR DERIVATIVE THEREOF AS ACTIVE MATERIAL

(75) Inventors: Hidehisa Mokudai, Saitama (JP); Toru Sukigara, Saitama (JP); Masaharu Sato, Kyoto (JP); Tomoaki Onoue, Kyoto (JP)

(73) Assignees: HONDA MOTOR CO., LTD., Tokyo (JP); MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/343,029

(22) PCT Filed: Sep. 7, 2012

(86) PCT No.: PCT/JP2012/072862
§ 371 (c)(1),
(2), (4) Date: Mar. 5, 2014

(87) PCT Pub. No.: WO2013/035829
PCT Pub. Date: Mar. 14, 2013

(65) Prior Publication Data
US 2014/0212754 A1    Jul. 31, 2014

(30) Foreign Application Priority Data
Sep. 7, 2011   (JP) ................ 2011-195028

(51) Int. Cl.
*H01M 4/60*       (2006.01)
*H01M 10/0525*    (2010.01)
*H01M 10/0569*    (2010.01)

(52) U.S. Cl.
CPC ......... *H01M 4/60* (2013.01); *H01M 10/0525* (2013.01); *H01M 10/0569* (2013.01); *H01M 2300/0045* (2013.01)

(58) Field of Classification Search
CPC ............. H01M 4/60; H01M 10/0525; H01M 10/0569; H01M 2300/0045; H01M 2300/0025; H01M 2300/0028
See application file for complete search history.

(56) References Cited

U.S. PATENT DOCUMENTS

| | | | |
|---|---|---|---|
| 8,349,503 B2 | 1/2013 | Saruwatari et al. | |
| 2006/0204855 A1* | 9/2006 | Saruwatari et al. | ......... 429/324 |
| 2014/0377621 A1* | 12/2014 | Hanyu | ............... H01M 10/052 429/102 |

FOREIGN PATENT DOCUMENTS

| | | |
|---|---|---|
| CN | 1835272 A | 9/2006 |
| JP | H0574458 | * 3/1993 |

(Continued)

OTHER PUBLICATIONS

JP 2008147015 MT.*

(Continued)

*Primary Examiner* — Alex Usyatinsky
(74) *Attorney, Agent, or Firm* — Westerman, Hattori, Daniels & Adrian, LLP

(57) ABSTRACT

Provided is a battery having a high charging/discharging capacity density as compared with a conventional one. The battery (1) is characterized by comprising a positive electrode (2), a negative electrode (3), and an electrolytic solution interposed between the positive electrode (2) and the negative electrode (3) and formed by dissolving an electrolytic solution in a solvent, wherein the positive electrode (2) includes rubeanic acid or a rubeanic acid derivative as an active material and the solvent includes an ionic liquid. In the battery (1), it is possible to neutralize, by anions present in the ions, positive charges generated when rubeanic acid or the rubeanic acid derivative is oxidized. Therefore, rubeanic acid or the rubeanic acid derivative can take three states from an oxidant to a reductant, so that a high (Continued)

charging/discharging capacity density can be obtained in comparison with a conventional one.

2 Claims, 2 Drawing Sheets

(56) References Cited

FOREIGN PATENT DOCUMENTS

| JP | 2008-147015 A | | 6/2008 |
|---|---|---|---|
| JP | 2009-212469 A | | 9/2009 |
| JP | 2011-124017 A | | 6/2011 |
| JP | 2012-164480 A | | 8/2012 |
| JP | 2012164480 | * | 8/2012 |
| JP | 5645319 | * | 12/2014 |
| WO | WO 2013/051308 | * | 4/2013 |

OTHER PUBLICATIONS

TCI Product 90957.*
Liquids for Electrochemical Devices Electrochemistry (2007), 75(1), 23-34.*
Office action for CN201280043214 from Aug. 10, 2016 MT.*
JPH0574458 MT.*
JP5645319 MT.*
JP2012164480MT.*
International Search Report dated Nov. 13, 2012, issued in corresponding application No. PCT/JP2012/072862.
Pickup et al.; "Polymer-Coated Electrodes in Ambient Temperature Molten Salts"; Journal of the Electrochemical Society, Sep. 1983 vol. 130, No. 9, pp. 1965-1967, cited in Extended Eurorean Search Report dated May 4, 2015 (3 pages).
Extended European Search Report dated May 4, 2015, issued in corresponding European Patent Application No. 12829247.1 (7 pages).

* cited by examiner

BATTERY CONTAINING RUBEANIC ACID OR DERIVATIVE THEREOF AS ACTIVE MATERIAL

TECHNICAL FIELD

The present invention relates to a battery containing rubeanic acid or a rubeanic acid derivative as an active material.

BACKGROUND ART

Conventionally, lithium ion batteries have been given focus as batteries of high energy density. It has been know that lithium ion batteries obtain a high voltage potential of 3 V or higher due to using a non-aqueous solution system electrolytic solution. However, there has been a problem in that conventional lithium ion batteries have a low charge-discharge capacity density per mass of cathode material (charge-discharge capacity density).

Therefore, the present applicant proposed a battery containing rubeanic acid (dithiooxamide) or a rubeanic acid derivative (hereinafter referred to as "rubeanic acid (derivative)") as an active material (refer to Patent Document 1). With this battery, as shown in the following formula (a), the rubeanic acid (derivative) binds with a lithium ion when reduced (discharging (a case of using rubeanic acid as cathode active material, same as below)), and releases the lithium ion when oxidized (charging (case of using rubeanic acid as cathode active material, same as below)). The lithium ion is supplied from the anode side, which contains a carbon material or silicon-tin-based material into which lithium ion is incorporated, in addition to lithium metal. According to this battery, it is said that a high charge-discharge capacity density is obtained even at room temperature or lower.

[Chem. 1]

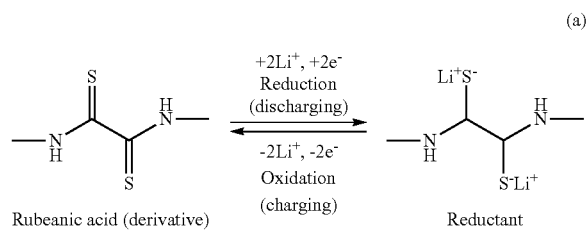

Rubeanic acid (derivative)   Reductant

[Patent Document 1] Japanese Unexamined Patent Application, Publication No. 2008-147015

DISCLOSURE OF THE INVENTION

Problems to be Solved by the Invention

However, even with the battery of Patent Document 1, it is not considered to have sufficient charge-discharge capacity density, and a further improvement in the charge-discharge capacity density has been demanded.

The present invention has been made taking the above into account, and an object thereof is to provide a battery having higher charge-discharge capacity density than conventionally.

Means for Solving the Problems

In order to achieve the above-mentioned object, the present invention is a battery (for example, the battery 1 described later) includes: a cathode (for example, the cathode 2 described later), an anode (for example, the anode 3 described later), and an electrolytic solution made by dissolving electrolyte in a solvent and interposed between the cathode and the anode, characterized in that the cathode includes rubeanic acid or a rubeanic acid derivative as an active material; and the solvent includes an ionic liquid.

In the present invention, an electrolytic solution made by dissolving electrolyte in a solvent containing an ionic liquid is used in the battery using rubeanic acid (derivative) as an active material, particularly as the cathode active material. In other words, in the electrolytic solution used in the battery of the present invention, since ions derived from the ionic liquid are present in addition to ions derived from the electrolyte, the amount of ions in the electrolytic solution increases remarkably compared to conventionally.

During oxidation (during charging) of the rubeanic acid (derivative), the ions, particularly anions, abundantly present in the electrolytic solution acts as a counter anion neutralizing the plus electrical charge of the oxidant in which an electron is further withdrawn from the state of rubeanic acid (derivative), a result of which it is possible to stably form this oxidant, and the charge capacity density can be improved.

In addition, during reduction (during discharge), it is possible to make discharge until from this oxidant until the reductant is formed, and thus the discharge capacity density can be improved.

Therefore, since the rubeanic acid (derivative) can assume three states from oxidant to reductant, higher charge-discharge capacity density can be obtained compared to conventionally. Moreover, since anion is smoothly supplied from the electrolyte and ionic liquid, the above-mentioned redox reaction progresses smoothly, and thus the charge-discharge capacity density can be improved.

In addition, in this case, the ionic liquid exemplifies imidazolium cations such as 2-ethylimidazolium, 3-propylimidazolium, 1-ethyl-3-methylimidazolium, 1-butyl-3-methylimidazolium, 1,3-dimethylimidazolium; quaternary ammonium cations such as diethyl methyl ammonium, tetrabutylammonium, cyclohexyl trimethyl ammonium, methyltri-n-octylammonium, triethyl(2-methoxyethoxymethyl)ammonium, benzyl dimethyl tetradecyl ammonium and benzyl trimethyl ammonium; and alternatively, alkyl pyridines, dialkyl pyrrolidinyls, tetraalkyl phosphoniums, trialkyl sulfoniums, etc. as the cations; however, it is not limited thereto.

In addition, in this case, the ionic liquid is exemplified with halide anions such as Cl$^-$, Br$^-$ and I$^-$; borate anions such as $BF_4^-$, $B(CN)_4^-$ and $B(C_2O_4)_2^-$; amide or imide anions such as $(CN)_2N^-$, $[N(CF_3)_2]^-$ and $[N(SO_2CF_3)_2]^-$; sulfate anions and sulfonate anions such as $RSO_3^-$ (hereinafter, R represents an aliphatic hydrocarbon group or aromatic hydrocarbon group), $RSO_4^-$, $R^fSO_3^-$ (hereinafter $R^f$ represents a fluorine-containing halogenated hydrocarbon group) and $R^fSO_4^-$; phosphate anions such as $R^f_2P(O)O^-$, $PF_6^-$ and $R^f_3PF_3^-$; antimony anions such as $SbF_6^-$; and additionally, lactate, nitrate ion, trifluoroacetate, etc. as anions; however, it is not limited thereto.

By using an ionic liquid containing the above such listed cations and anions, the above-mentioned effects of the invention will be more reliably exhibited.

In addition, in this case, it is preferable for the rubeanic acid or rubeanic acid derivative to have a structural unit represented by formula (1) below.

$R^1$ and $R^2$ in the formula (1) each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group.

In addition, in this case, it is preferable for the rubeanic acid or rubeanic acid derivative is represented by formula (2) below.

$$R^3—(NR^1—CS—CS—NR^2)_n—R^4 \quad (2)$$

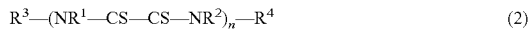

$R^1$, $R^2$, $R^3$ and $R^4$ in the formula (2) each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group; and n represents an integer of at least 1.

In addition, in this case, although the electrolyte is exemplified with $PF_6^-$, $AsF_6^-$, $BF_4^-$, $Cl^-$, $Br^-$, $ClO_4^-$, $CH_3SO_3^-$, $CF_3SO_3^-$, $C_4F_9SO_3^-$, $(CF_3SO_2)_2N^-$, and $(CF_3SO_2)_3C^-$, $C_4F_9SO_3^-$, $(CF_3SO_2)_2N^-$, and $(CF_3SO_2)_3C^-$ as anions, it is not limited thereto.

By using a rubeanic acid (derivative) represented by the above formula (1) or (2) in the battery of the present invention, it can assume the three states from oxidant to reductant as shown in the following formula (b). More specifically, during the oxidation (charging) reaction, it is possible to fully oxidize (charge) by two electrons to the oxidant shown on the left side of the following formula (b), and during the subsequent reduction (discharging) reaction, it is possible to fully reduce (discharge) by four electrons to the reductant shown on the right side of the following formula (a). Therefore, a higher charge-discharge capacity density is obtained than conventionally.

Figure 1:
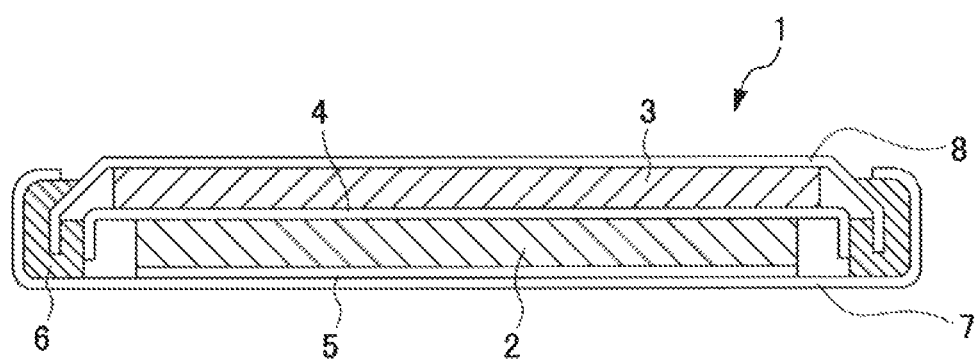
FIG. 1 is a vertical cross-sectional view showing the configuration of a battery according to an embodiment of the present invention.

EXPLANATION OF REFERENCE NUMERALS 1 battery
2 cathode
3 anode
4 separator

PREFERRED MODE FOR CARRYING OUT THE INVENTION

Hereinafter, an embodiment of the present invention will be explained in detail while referencing the drawings.

FIG. 1 is a vertical cross-sectional view showing the configuration of a battery 1 according to an embodiment of the present invention. It should be noted that, in the following explanation, when explaining the vertical direction, the explanation is based on up and down in FIG. 1.

As shown in FIG. 1, the battery 1 is a coin-type lithium battery in which the profile thereof is a disk shape, and corresponds to the CR2032 standard. The battery 1 includes a cathode can 7 arranged at a lower side, an anode can 8 arranged at an upper side, and therebetween includes a cathode 2 and anode 3 provided in order from the lower side.

Between the cathode 2 and anode 3, a separator 4 that separates both from each other is inserted. A current collector 5 is arranged between the cathode 2 and the cathode can 7, and the cathode can 7 and anode can 8 are electrically isolated by a gasket 6.

The cathode 2 contains rubeanic acid or a rubeanic acid derivative as the active material. Herein, "rubeanic acid

[Chem. 2]

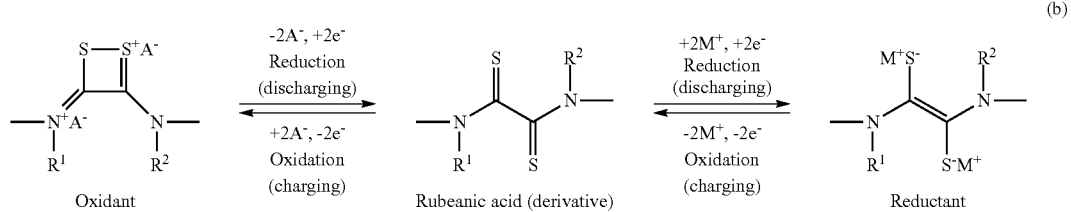

(b)

Oxidant    Rubeanic acid (derivative)    Reductant $R^1$ and $R^2$ in the above formula (b) are the same as the above formula (1) or (2); $A^-$ represents anions derived from the above listed ionic liquid and anions derived from the electrolyte; and $M^+$ represents at least one type of metal cation selected from the group consisting of alkali metal cations including $Li^+$, $Na^+$ and $K^+$, as well as divalent metal cations of group 2 elements including $Be^{2+}$, $Mg^{2+}$ and $Ca^{2+}$.

Effects of the Invention

According to the present invention, it is possible to provide a battery having a higher charge-discharge capacity density than conventionally.

derivative" means a compound containing rubeanic acid, and rubeanic acid polymers, etc. are also included.

The rubeanic acid (derivative) preferably has a structural unit represented by the following formula (1)

$$—(NR^1—CS—CS—NR^2)— \quad (1)$$

In the above formula (1), $R^1$ and $R^2$ each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group.

In addition, the rubeanic acid (derivative) is preferably represented by the following formula (2).

  (2)

In the above formula (2), $R^1$, $R^2$, $R^3$ and $R^4$ each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group; and n represents an integer of at least 1.

In the present embodiment, the rubeanic acid ($NH_2$—CS—CS—$NH_2$) is particularly preferable. Rubeanic acid itself does not have conductivity.

The rubeanic acid (derivative) may contain lithium (lithium ion) in a form reduced beforehand, as described later.

The cathode 2 preferably contains a conductive auxiliary and a binder.

As the conductive auxiliary, for example, carbon materials such as acetylene black, ketjenblack, graphite, and scaly graphite; metal powders such as nickel powder, titanium powder, silver powder and tungsten power; and conductive polymeric compounds such as polyaniline, polypyrrole and polyacetylene can be exemplified.

As the binder, for example, polytetrafluoroethylene, polyvinylidene fluoride, and the like can be exemplified.

In addition, the cathode 2 may contain the electrolyte described later, and may contain other active materials besides the rubeanic acid (derivative).

As other active materials, they are not particularly limited so long as able to store and release lithium ions. For example, those containing lithium ions such as lithium salts can be exemplified, and thereamong, lithium transition metal composite oxides are preferable.

As the lithium transition metal composite oxide, for example, lithium cobalt oxide, lithium nickel oxide, lithium manganese oxide, lithium nickel-cobalt-manganese oxide, and the like can be exemplified.

The content ratio of rubeanic acid (derivative) contained in the cathode 2 is preferably 1 to 100% by mass, and is more preferably 50 to 100% by mass.

The anode 3 contains an active material that can store (incorporate) and release (desorb) lithium ion.

As the active material, those containing lithium element (for example, lithium atom, lithium metal, lithium ion, lithium salt), and those not containing lithium element can be exemplified.

As those containing lithium element, for example, other than metallic lithium (including lithium alloys containing aluminum, etc.), lithium nitrides such as $Li_{2.4}Co_{0.6}N$ and lithium oxides such as lithium titanate, etc. can be exemplified.

As those not containing lithium element, for example, graphite materials such as mesocarbon microbeads (MCMB); products of combusting and carbonizing phenol resin, pitch, etc.; carbon-based materials such as activated charcoal and graphite; silicon-based materials such as SiO and $SiO_2$; tin-based materials such as SnO and $SnO_2$; lead-based materials such as PbO and $PbO_2$; germanium-based materials such as GeO and $GeO_2$; phosphorus-based materials; niobium-based materials; antimony-based materials; and mixtures of these materials can be exemplified.

The anode 3 may include the aforementioned conductive auxiliary and binder.

As the anode 3, in the case of lithium element not being contained in the cathode 2, for example, one containing metallic lithium can be used, and in the case of lithium element (lithium ion, etc.) being contained in the cathode 2, although one containing lithium element is also used, one in which lithium element is not contained can be used.

It should be noted that the non-aqueous solution system battery free of lithium element in the cathode 2 and containing metallic lithium in the anode 3 can also be made to function as a primary battery.

As the separator 4, a sheet made of resin containing the electrolytic solution described later can be used, for example.

As the resin forming the sheet made of resin, it may be a conventional, known one, and a polyolefinic resin can be exemplified, for example.

As the electrolytic solution, one produced by causing an electrolyte to dissolve in a solvent can be employed.

As the electrolyte, supporting electrolytes consisting of cations such as alkali metal ions ($Li^+$, $Na^+$, $K^+$, etc.) and divalent metal ions ($Be^{2+}$, $Mg^{2+}$, $Ca^{2+}$, etc.) consisting of group 2 elements; and anions such as $PF_6^-$, $AsF_6^-$, $BF_4^-$, $Cl^-$, $Br^-$, $ClO_4^-$, $CH_3SO_3^-$, $CF_3SO_3^-$, $C_4F_9SO_3^-$, $(CF_3SO_2)_2N^-$, and $(CF_3SO_2)_3C^-$ can be used.

According to these supporting electrolytes, $PF_6^-$, $AsFC_6^-$, $BF_4^-$, $Cl^-$, $Br^-$, $ClO_4^-$, $CH_3SO_3^-$, $CF_3SO_3^-$, $C_4F_9SO_3^-$, $(CF_3SO_2)_2N^-$, $(CF_3SO_2)_3C^-$ are supplied as anions derived from electrolyte.

It should be noted that the concentration of supporting electrolyte relative to the solvent described later in the range of 0.1 to 2.0 mol/L can be used, for example.

As the solvent dissolving the aforementioned electrolyte, a solvent containing an ionic liquid is used. Preferably, from the viewpoint of a higher charge-discharge capacity density being obtained, a solvent containing an ionic liquid as the main solvent is used. More preferably, a solvent consisting of only ionic liquid is used.

The ionic liquid used in the present embodiment, similarly to a general secondary battery, carries out the migration of ions as a supporting electrolyte of an electrochemical reaction, as well as assuming a function as a reactant in the electrochemical reaction.

Herein, ionic liquid indicates an ionic compound consisting of only ionic molecules combining cations and anions, and that is a liquid under conditions less than 100° C.

As cations of the ionic liquid that can be used in the present embodiment, imidazoles, ammoniums, etc. can be exemplified. Preferably, 2-ethylimidazolium, 3-propylimidazolium, 1-ethyl-3-methylimidazolium, 1-butyl-3-methylimidazolium, 1,3-dimethylimidazolium, diethyl methyl ammonium, tetrabutylammonium, cyclohexyl trimethyl ammonium, methyl-tri-n-octyl ammonium, cyclohexyl trimethyl ammonium, benzyl dimethyl tetradecyl ammonium, benzyl trimethyl ammonium, etc. can be exemplified. Other than the above-mentioned imidazoles and ammoniums, alkyl pyridines, dialkyl pyrrolidinyls, tetraalkyl phosphoniums, trialkyl sulfoniums, etc. can be exemplified.

As anions of the ionic liquid that can be used in the present embodiment, a halide anion, borate anion, amide anion, imide anion, sulfonate anion, sulfate anion, phosphate anion, antimony anion, etc. can be exemplified. Preferably, $Cl^-$, $Br^-$, $I^-$, $BF_4^-$, $B(CN)_4^-$, $B(C_2O_4)_2^-$, $(CN)_2N^-$, $[N(CF_3)_2]^-$, $[N(SO_2CF_3)_2]^-$, $RSO_3^-$ (hereinafter, R represents an aliphatic hydrocarbon group or aromatic hydrocarbon group); $RSO_4^-$, $R^fSO_3^-$ (hereinafter $R^f$ represents a fluorine-containing halogenated hydrocarbon group), $R^fSO_4^-$, $R^f{}_2P(O)O^-$, $PF_6^-$, $R^f{}_3PF_3^-$, and $SbF_6^-$ can be exemplified, and additionally, lactate, nitrate ion, trifluoroacetate, etc. can be exemplified.

In the present embodiment, in the case of containing ionic liquid as the main solvent, for example, carbonic ester (carbonate)-based solvents such as ethylene carbonate, propylene carbonate, dimethyl carbonate, methylethyl carbonate and diethyl carbonate; ester (also including cyclic esters)-based solvents such as methyl propionate, ethyl propionate and γ-butyrolactone; ether-based solvents such as monoglyme (ethylene glycol dimethyl ether), diglyme (diethylene glycol dimethyl ether), triglyme (triethylene glycol dimethyl ether), tetraglyme (tetraethylene glycol dimethyl ether); and mixed solvents of these can be used as a sub solvent.

Next, operation of the battery 1 of the present embodiment will be explained. More specifically, the redox reaction of the rubeanic acid (derivative) contained in the cathode 2 of the battery 1 having the anode 3 containing metallic lithium will be explained.

With the battery 1, the rubeanic acid (derivative) contained in the cathode 2 reversibly changes to the oxidant and reductant shown in the following formula (b). Herein, $R^1$, $R^2$, $A^-$ and $M^+$ in the following formula (b) are as mentioned above.

[Chem. 3]

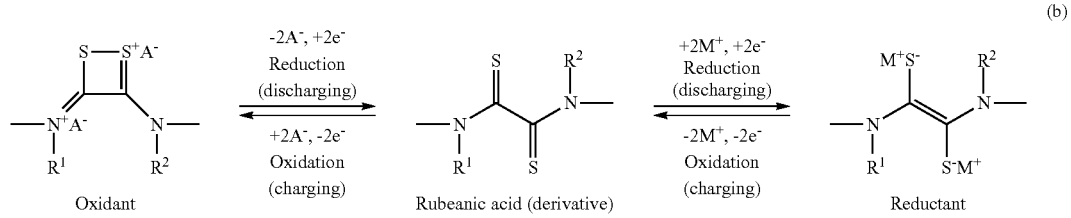

(b)

First, in the initial state in which neither of charging and discharging is being performed, the rubeanic acid (derivative) in the center of the above formula (b) changes to the reductant on the right side during reduction (discharging).

At this time, an electron ($e^-$) is produced by the metallic lithium (Li) becoming a lithium ion ($Li^+$), and is supplied to the cathode 2 via the cathode can 7 and the current collector 5. Furthermore, in addition to the lithium ion ($Li^+$) being supplied from the electrolyte in the electrolytic solution, it is supplied to the cathode 2 via the electrolytic solution contained in the separator 4 from the anode 3 (lithium metal, or silicon-tin material, carbon material to lithium ion has been introduced) side. The lithium ion ($Li^+$) supplied to the cathode 2 acts as a counter cation neutralizing the minus electrical charge of the reductant, a result of which this reductant is stably formed.

It should be noted that, in the case of the cathode 2 containing lithium, and the anode 3 being a lithium-free compound (for example, graphite), immediately after assembling the battery 1 is a discharged state, and the rubeanic acid (derivative) exists as a reductant on the right side in the above formula (b). For this reason, starting from oxidation (charging), the reductant on the right side of the above formula (b) changes to the rubeanic acid (derivative) in the center.

At this time, an electron ($e^-$) is produced simultaneously with a Li ion ($Li^+$) in the reductant desorbing on the cathode 2. The desorbed lithium ion ($Li^+$) heads towards the anode 3 via the electrolytic solution contained in the separator 4, as well as becoming metallic lithium (Li) and depositing on the anode 3, by donating an electron ($e^-$). In addition, the produced electron ($e^-$) is supplied to the anode 3 via the cathode can 7, load and anode can 8. Then, at the anode 3, one lithium is incorporated by accepting and withdrawing one n electron by a 6 carbon group taking the form of a hexagon.

Furthermore, after changing to the rubeanic acid (derivative) at the center, it changes to the oxidant on the left side.

At this time, the rubeanic acid (derivative) releases an electron ($e^-$) at the cathode 2, and an anion ($A^-$) from the electrolytic solution contained in the separator 4 is supplied to the cathode 2. In more detail, the anion derived from the supporting electrolyte as electrolyte and the anion derived from the ionic solution as the solvent are supplied to the cathode 2. These supplied anions ($A^-$) act as counter anions neutralizing the plus electrical charge of the oxidant in which an electron is further extracted from the state of rubeanic acid (derivative), a result of which the oxidant is stably formed.

In addition, the released electron ($e^-$) is supplied to the anode 3 via the cathode can 7, load and anode can 8.

Next, when discharging is started, it changes from the oxidant on the left side to the rubeanic acid (derivative) in the center.

At this time, an electron ($e^-$) is produced by metallic lithium (Li) becoming lithium ion ($Li^+$), and is supplied to the cathode 2 via the anode can 8, cathode can 7 and current collector 5. In addition, the anion ($A^-$) is released, and supplied to the electrolytic solution contained in the separator 4.

Then, discharge progresses further, and it changes from the rubeanic acid (derivative) in the center to the reductant on the right side. The battery 1 operates in the above way.

Herein, in the case of the rubeanic acid (derivative) releasing an electron to form the oxidant, only the counter anion $A^-$ for neutralizing the plus electrical charge of the rubeanic acid (derivative) exists in the electrolytic solution. In addition, in the initial charge and discharge, the solid electrolyte membrane referred to as SEI (Solid Electrolytic solution Interface) having a function of suppressing degradation of the electrolytic solution and electrodes is formed on the surface of the electrodes; however, anions in the electrolytic solution are also consumed upon formation of this membrane. For this reason, in a conventional battery, it is not possible to form oxidant of the rubeanic acid (derivative) during charging (oxidation).

In contrast, with the battery 1 of the present embodiment as mentioned above, anions derived from the ionic liquid are present in addition to anions derived from the supporting electrolyte, and thus an abundance of anions are present in the electrolytic solution compared to conventionally. It is thereby configured so that the rubeanic acid (derivative) can assume three states from oxidant to reductant.

Next, a production method of the battery 1 of the present embodiment will be explained. More specifically, a first production method for a case of containing metallic lithium in the anode 3 and a second production method for a case of not containing metallic lithium in the anode 3 will be explained separately.

The first production method will be explained.

First, after kneading the rubeanic acid (derivative), conductive auxiliary and binder, the kneading product is spread into sheet form, and this is punched out into a predetermined shape, thereby forming the cathode 2.

In addition, a foil containing metallic lithium such as lithium or lithium alloy is punched out into a predetermined shape, thereby forming the anode 3.

Next, the cathode 2 is arranged via the current collector 5 at the bottom of the cathode can 7, and the separator 4 is arranged on the cathode 2. The separator 4 forms by causing the electrolytic solution made by dissolving supporting electrolyte serving as the electrolyte into a solvent containing ionic liquid to impregnate a porous resin sheet arranged on the cathode 2, for example.

Next, the anode 3 is arranged on the separator 4, along with the anode can 8 being arranged on this anode 3. At this time, the gasket 6 is arranged in order to electrically isolate the cathode can 7 and anode can 8. Then, the peripheral edge of the cathode can 7 is crimped, and the cathode can 7 and anode can 8 are joined via the gasket 6. The battery 1 is thereby produced.

The second production method will be explained.

First, an electrode body containing the rubeanic acid (derivative) is prepared. In this step, the electrode body is prepared similarly to the step of forming the anode 2 in the first production method.

Next, the lithium (lithium ion) is occluded to the obtained electrode body to prepare a first electrode. This first electrode can be obtained by reducing the rubeanic acid (derivative) contained in the electrode body to cause to change to the reductant, as well as causing lithium ion to bind to this. As such a first electrode, for example, after discharging the battery 1 obtained by the first production method, the cathode 2 removed from this battery 1 can be used.

On the other hand, a second electrode is prepared from an electrode material not containing metallic lithium that is an active material capable of storage and release of lithium ion. This second electrode is produced by spreading a kneading product containing the active material for the anode such as the aforementioned graphite material, carbon-based material and metal oxide, binder and, as necessary, conductive auxiliary into a sheet form, and then punching out into a predetermined shape.

Next, the battery 1 is produced through a process of incorporating the first electrode as the cathode 2, and incorporating the second electrode as the anode 3. As this process, other than using the first electrode and the second electrode as the cathode 2 and anode 3, a process of assembling the current collector 5, cathode 2, separator 4 and anode can 8 in this order to the cathode can 7 can be adopted, similarly to the first production method.

An anode 3 not containing metallic lithium, which is highly reactive, can be used in the above such second production method.

The following effects are exerted according to the battery 1 of the present embodiment.

In the present embodiment, an electrolytic solution made by dissolving electrolyte into a solvent containing an ionic liquid is used in the battery 1 using the rubeanic acid (derivative) as the active material of the cathode 2. In other words, in the electrolytic solution used in the battery 1 of the present embodiment, since anions derived from the ionic liquid are present in addition to anions derived from the electrolyte, the amount of anions in the electrolytic solution increases remarkably compared to conventionally.

During oxidation (during charging) of the rubeanic acid (derivative), the anion abundantly present in the electrolytic solution acts as a counter anion neutralizing the plus electrical charge of the oxidant in which an electron is further withdrawn from the state of rubeanic acid (derivative), a result of which it is possible to stably form this oxidant, and the charge capacity density can be improved.

In addition, during reduction (during discharge), it is possible to make discharge from this oxidant until the reductant is formed, and thus the discharge capacity density can be improved.

Therefore, since the rubeanic acid (derivative) can assume three states from oxidant to reductant, higher charge-discharge capacity density can be obtained compared to conventionally. Moreover, since anion is smoothly supplied from the electrolyte and ionic liquid, the above-mentioned redox reaction progresses smoothly, and thus the charge-discharge capacity density can be improved.

The battery 1 of the present embodiment can be applied to either one of a non-aqueous solution-system primary battery and a non-aqueous solution-system secondary battery. The non-aqueous solution-system primary battery, for example, can be employed in the power source for a wristwatch, the power source for a small music-playback device, and the power source of small electronic devices such as the backup of a personal computer, etc. In addition, the non-aqueous solution-system secondary battery can be employed in mobile devices such as mobile telephones and digital cameras, as well as the power source for moving bodies like electric vehicles, and bipedal walking robots.

It should be noted that the present invention is not to be limited to the above-mentioned embodiment, and that modifications and improvements within a scope that can achieve the object of the present invention are included in the present invention.

In the above-mentioned embodiment, a coin-shaped lithium battery was applied as the battery 1; however, it is not limited thereto. For example, it may be applied to a square-type, cylindrical-type or paper-type battery.

EXAMPLES

Next, although the present invention will be explained in further detail based on examples, the present invention is not to be limited thereto.

Example 1

Preparation of Cathode

First, sorting of at least 99% purity rubeanic acid ("D0957" manufactured by Tokyo Chemical Industry Co., Ltd.) was performed to prepare 5 grams of rubeanic acid powder consisting of 5 to 40 μm particle size.

Next, 4 g of vapor-phase grown carbon fiber ("VGCF (registered trademark)" manufactured by Showa Denko K.K.) as the conductive auxiliary, 0.5 g of polytetrafluoroethylene ("6-J" manufactured by Du Pont-Mitsui Fluorochemicals Co., Ltd.) as the binder, and 0.5 g of the rubeanic acid powder prepared above were sufficiently stirred with a small-scale V mixer. After stirring, the kneading product was prepared by kneading in an automatic mortar.

Next, the prepared kneading product was molded into sheet form of 0.3 mm thickness, and then a disk obtained by punching out this with a 14-mm diameter punch and a circular net made from pure titanium with a diameter of 15 mm (manufactured by Hokuto Denko Corp.) were superimposed, and pressed with a hydraulic press. A cathode in which the disk and net were integrated was thereby obtained.

The obtained cathode was vacuum dried for 16 hours at 80° C., and then kept inside of a glove box at the dew point to no more than 70° C. in which argon gas circulated.
(Preparation of Battery)

Using a member for a coin-type battery (manufactured by Hohsen Corp.) corresponding to the CR2032 standard, a non-aqueous solution system coin-type battery was prepared. The cathode prepared as described above was used as the cathode, and a circular metallic lithium foil (0.2 m thickness, 16 mm diameter) with 99.95% purity was used as the anode. In addition, as the separator, using one produced by vacuum drying a disk (30 μm thickness, 20 mm diameter) consisting of a polyolefinic porous film ("HIPORE (registered trademark)" manufactured by Asahi Kasei Corp.) at 60° C. for 24 hr, 200 μL of the electrolytic solution described later was injected and allowed to impregnate into this separator. The coin-type battery of Example 1 was thereby obtained.

It should be noted that, as the electrolytic solution, one was used prepared using 1-ethyl-3-methylimidazolium bis(fluorosulfonyl)imide, which is an ionic liquid represented by the following formula (3) as the solvent, and causing lithium bis(trifluoromethanesulfonyl)imide, which is a supporting electrolyte serving as the electrolyte represented by the following formula (4), to dissolve so as to be 1.0 mol/L.

[Chem. 4]

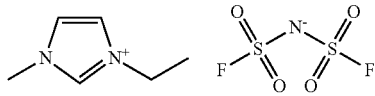

(3)

[Chem. 5]

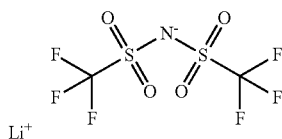

(4)

Comparative Example 1

Other than using as is a commercially available electrolytic solution ("LBG-94913" manufactured by Kishida Chemical Co., Ltd.) in which $LiPF_6$ had been dissolved at 1.0 mol/L into a mixed solvent produced by mixing ethylene carbonate and diethyl carbonate in a volume ratio of 3:7 as the electrolytic solution, the coin-type battery of Comparative Example 1 was obtained by the same operations as Example 1.
Charge-Discharge Test Charge-discharge tests were conducted on the batteries obtained in Example 1 and Comparative Example 1. The charge-discharge test was conducted after leaving each battery to stand for 1 hr at room temperature immediately after preparation. More specifically, inside a thermostatic bath maintained at 25° C.±2° C., the voltage changing over time when discharging after charging at a constant current of 0.1 mA was measured (potential difference between cathode and anode). The measurement results are shown in FIGS. 2 and 3.

Figure 2:
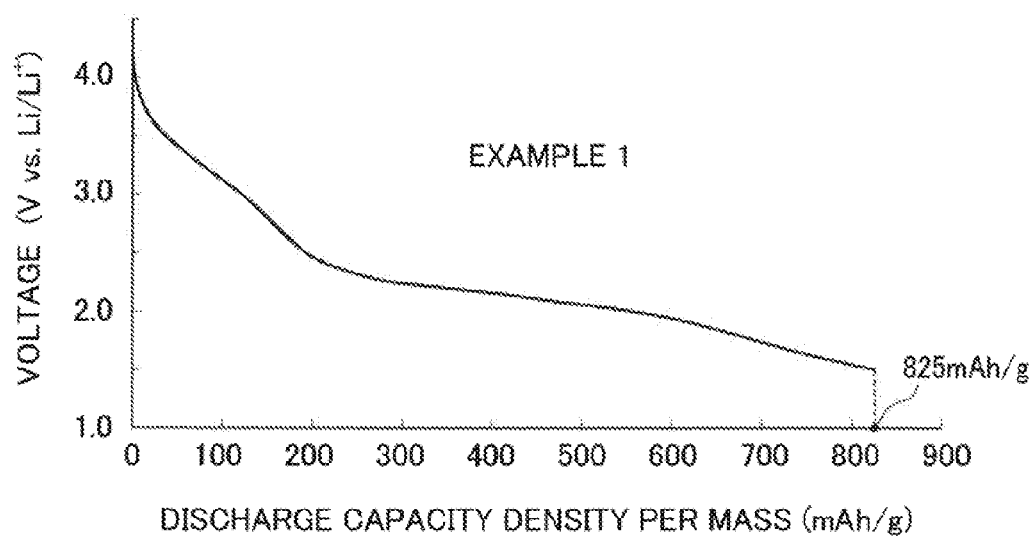
FIG. 2 is a discharge curve graph of a battery of Example 1.
Figure 3:
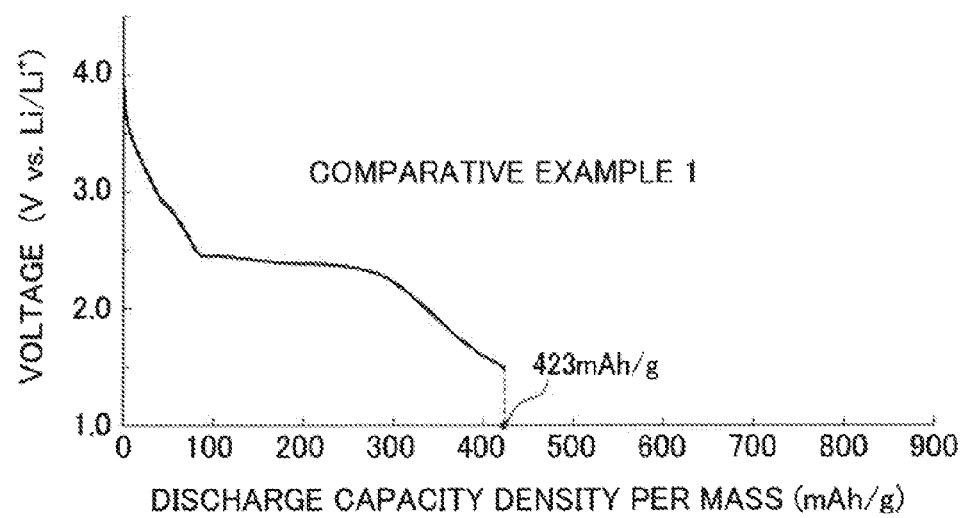
FIG. 3 is a discharge curve graph of a battery of Comparative Example 1.

FIG. 2 is a discharge curve graph for Example 1, and FIG. 3 is a discharge curve graph for Comparative Example 1. In FIGS. 2 and 3, the vertical axis represents voltage (V), and the horizontal axis indicates the discharge capacity density (mAh/g) per mass of cathode active material (rubeanic acid (derivative)).

The discharge capacity density of Comparative Example 1 as shown in FIG. 3 was unable to attain the theoretical capacitance of 446 mAh/g theoretically calculated assuming a 2 electron reaction, i.e. reaction not via the oxidant of the above formula (a), and was 423 mAh/g.

In contrast, the discharge capacity density of Example 1 as shown in FIG. 2 was 825 mAh/g, far exceeding the above-mentioned theoretical capacitance of 446 mAh/g. From these results, it was understood that an electron reaction exceeding the above-mentioned two electron reaction is progressing, and it was confirmed to have a higher charge-discharge capacity density than conventionally.

The invention claimed is:
1. A battery including a cathode, an anode, and an electrolytic solution made by dissolving electrolyte in a solvent and interposed between the cathode and the anode,
wherein the cathode comprises rubeanic acid or a rubeanic acid derivative as an active material,
wherein the rubeanic acid or rubeanic acid derivative has a structural unit represented by formula (1) below,

$$-(NR^1-CS-CS-NR^2)- \quad (1)$$

wherein $R^1$ and $R^2$ in the formula (1) each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group,
wherein the solvent comprises an ionic liquid which is 1-ethyl-3-methylimidazolium bis(fluorosulfonyl)imide,
wherein the rubeanic acid or rubeanic acid derivative includes an oxidant that has fully been oxidized (charged) by two electrons to the oxidant during an oxidation (charging) reaction, and includes a reductant that has been fully reduced (discharged) by four electrons to the reductant during a reduction (discharging) reaction, and
wherein a total amount of anions derived from a supporting electrolyte as the electrolyte and anions derived from the ionic liquid as the solvent is greater than an amount of anions consumed upon formation of a solid electrolyte membrane formed on a surface of an electrode in initial charge and discharge.

2. The battery according to claim 1, wherein the rubeanic acid or rubeanic acid derivative is represented by formula (2) below, $$R^3-(NR^1-CS-CS-NR^2)_n-R^4 \quad (2)$$

wherein $R^1$, $R^2$, $R^3$ and $R^4$ in the formula (2) each individually represent a hydrogen atom, a halogen atom, a saturated linear hydrocarbon group, an unsaturated linear hydrocarbon group, a saturated cyclic hydrocarbon group, an unsaturated cyclic hydrocarbon group, a saturated heterocyclic group, an unsaturated heterocyclic group, an aromatic hydrocarbon group, an aromatic heterocyclic group, a carbonyl group, a carboxyl group, an amino group, an amide group, a hydroxyl group, a sulfide group, a disulfide group or a sulfone group; and n represents an integer of at least 1.

\* \* \* \* \*